United States Patent [19]
Heller

[11] Patent Number: 5,525,894
[45] Date of Patent: Jun. 11, 1996

[54] ROTARY INDUCTION GENERATOR ADAPTED TO BE DRIVEN BY A PRIME MOVER FOR GENERATING ELECTRIC POWER

[75] Inventor: Samuel Heller, Westchester County, N.Y.

[73] Assignee: Heller-DeJulio Corporation, Concord, Calif.

[21] Appl. No.: 432,679

[22] Filed: May 2, 1995

Related U.S. Application Data

[63] Continuation of Ser. No. 169,157, Dec. 17, 1993, abandoned, which is a continuation-in-part of Ser. No. 924,306, Aug. 3, 1992, abandoned.

[51] Int. Cl.$^6$ .................................................. H02P 9/00
[52] U.S. Cl. ................... 322/20; 322/29; 322/32; 322/47
[58] Field of Search .................................. 322/35, 47, 20, 322/29, 32

[56] References Cited

U.S. PATENT DOCUMENTS

| | | | |
|---|---|---|---|
| 911,147 | 2/1909 | Mershon | 322/47 |
| 3,969,659 | 7/1976 | Thode | 318/237 |
| 4,006,399 | 2/1977 | Studtmann | 320/47 |
| 4,019,104 | 4/1977 | Parker | 318/195 |
| 4,242,628 | 12/1980 | Mohan et al. | 322/47 X |
| 4,532,465 | 7/1985 | Renard | 318/814 |

Primary Examiner—Steven L. Stephan
Assistant Examiner—Nicholas Ponomarenko
Attorney, Agent, or Firm—Flehr, Hohbach, Test, Albritton & Herbert

[57] ABSTRACT

A rotary induction generator having a stator with stator windings defining a three-phase stator and a rotor mounted for rotation therein, and having wound thereon three rotor windings defining a three-phase rotor and having resistive-reactive means connected to said secondary windings to increase the efficiency of said generator and limit the power output to the capacity of the generator over a wide range of speeds.

6 Claims, 3 Drawing Sheets

ROTARY INDUCTION GENERATOR ADAPTED TO BE DRIVEN BY A PRIME MOVER FOR GENERATING ELECTRIC POWER

CROSS REFERENCE TO RELATED APPLICATION

This is a continuation of application Ser. No. 08/169,157, filed Dec. 17, 1993, now abandoned, which is a continuation-in-part of prior application Ser. No. 07/924,306, filed Aug. 3, 1992 now abandoned.

FIELD OF THE INVENTION

This invention relates generally to rotary induction generators of the type having a wound rotor, and more particularly to wound rotor induction generators for generating electrical power.

BACKGROUND OF THE INVENTION

In wound rotor induction generators, the currents in the secondary winding (usually the rotor) are created solely by induction. These currents result from voltages induced in the secondary windings by the rotating magnetic fields in the primary winding arising from the application of line voltages thereto. The rotor windings are generally connected to slip rings. When the rotor is driven at above the synchronous speed, either shorted or with proper equipment attached thereto as with a load connected to the slip rings, the machine acts as a generator over a wide range.

In general an induction generator with a squirrel-cage rotor has a "closed door" effect when overloaded. At overload, which occurs when the speed exceeds the synchronous speed by an amount slightly above the motor slip speed, the generator stops delivering power and offers little resistance to the prime mover. This occurs at rotary speeds quite close to normal operation. When the load is lost, the prime mover and the induction generator race to destruction together.

For the past thirty years or more when driving a generator or a squirrel-cage type induction generator with various types of prime movers, the speed of the electrical generator was kept nearly constant by employing mechanical methods for controlling the speed of the prime mover. These mechanical methods also limited the speed of the prime mover when the load was lost.

For generators driven by wind power, spoilers or blade pitch control or mechanical brakes are used to limit the speed. These methods have a very short life and are costly to maintain.

The frequency in the wound secondary of the generator is in direct proportion to the rpm above the base speed. Thus, in a 900 rpm, 8 pole, 60 Hz machine, the frequency in the secondary at 900 rpm is zero. The rise in frequency is 60 Hz for each 900 rpm above base speed. So it is 30 Hz (Hertz, cycles) at 1350 rpm (900+450=1350) and 60 Hz (cycles) in the secondary of this machine at 1800 rpm. This is important; it means the generator is being driven in the same direction that it would run as a motor. Thus, there is no need to reverse any connections to use the generator as a motor for assisting the generator to reach base speed by means of any variable speed prime mover or power source, including wind and wave power.

OBJECTS AND SUMMARY OF THE INVENTION

It is an object of this invention to provide a wound rotor induction generator which, when operated above its rated speed, still delivers power and continues to present a receptive load to the prime mover, thereby eliminating the necessity for uncertain mechanical speed controls on the prime mover.

It is another object of this invention to provide a rotary induction generator suitable for use in wind and wave power applications.

It is a further object of this invention to provide an induction generator which can be operated efficiently over a wide range of rotor speeds at constant frequency output.

An objective for electric power generation is to get maximum power output. The generator of the present invention can deliver power over a much wider range and a larger capacity than known generators. The generator maintains its load over a wide speed range, including speeds at which induction generators of the squirrel-cage type normally stop delivering power, at which time the traditional induction generator offers little resistance to the prime mover, often allowing the prime mover to speed to destruction.

The foregoing and other objects of the invention are achieved by an induction generator which includes a rotor mounted for rotation in said stator and having wound thereon three rotor windings defining a three-phase rotor; said three-phase stator windings adapted to be connected to a source of power and serving as a primary winding coupled to said magnetic field, whereby currents are induced in said secondary windings; reactive means connected to said secondary windings to increase the efficiency of said generator and limit the power output at higher speeds; and resistive means connected in series with said windings to provide current in the secondary and generate the necessary magnetic fields for power generation.

These and other objects of this invention will be more clearly understood from the following detailed description when taken in conjunction with the drawings, wherein:

DESCRIPTION OF THE PREFERRED EMBODIMENT

Figure 1:
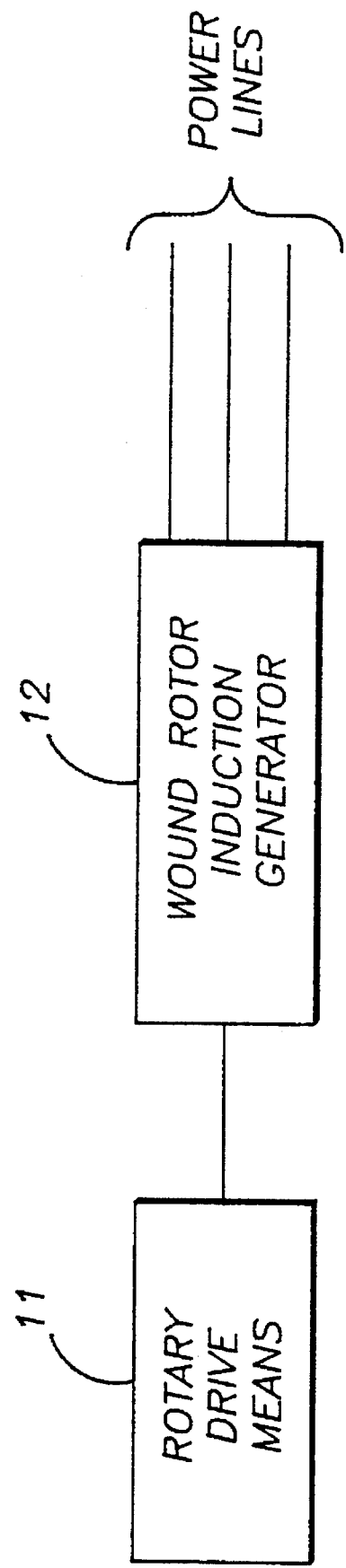
FIG. 1 is a schematic diagram of an energy conversion system in accordance with this invention.

Referring to FIG. 1, there is shown rotary drive means 11 connected to a wound rotor induction generator 12. The rotary drive means 11 can be driven from a wind turbine or from wave energy conversion apparatus. Alternatively, the drive means may be any other prime mover such as a gas or diesel engine. In either event, the rotary speed at which the generator is driven will depend directly on the velocity of the prime mover. As described above, in conventional systems mechanical means are provided to maintain optimum rotary speed for the associated prime mover. Generally, such generators are induction generators driven at a substantially constant rotor speed. At excessive speeds the generator stops generating, reducing the load on the prime mover, allowing it to run to destruction. Often the speed control does not respond rapidly enough to changes in prime mover speed, resulting in damage to the prime mover.

I have discovered that by adding a reactive-capacitive load in series with the secondary windings and other parallel resistive circuits, also in series with the secondary windings, the maximum power can be limited to prevent damage to the generator windings and the loss of output with overspeed operation can be eliminated.

Figure 2:
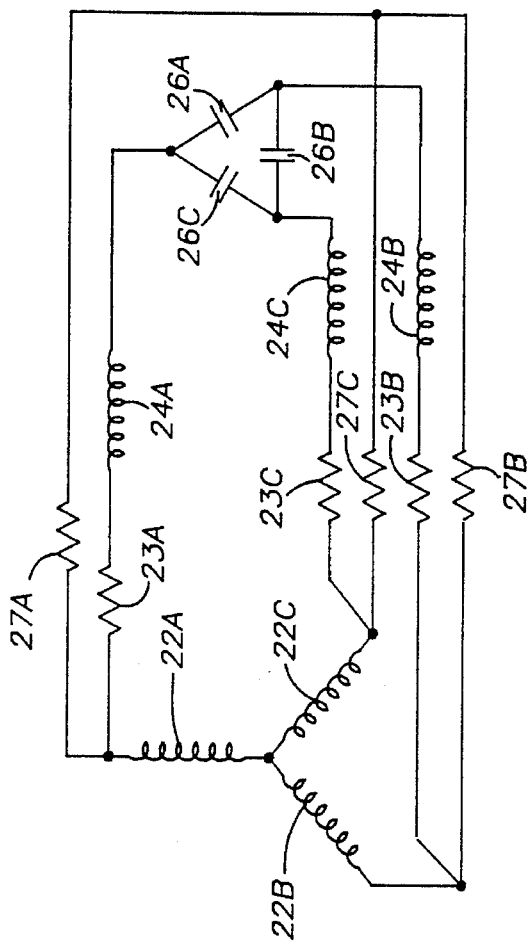
FIG. 2 is a schematic diagram of a wound rotor induction generator for use in the energy conversion system of this invention.

Referring to FIG. 2, a three-phase wye connected generator is shown with the stator windings 21A, 21B, 21C connected to three-phase power lines operating at 60 Hz. The power lines serve to generate revolving fields which excite current in the secondary windings 22A, 22B, 22C wound upon the rotor. As described above, no currents are induced in the rotor's secondary windings when the rotor is rotating at the speed of the rotating fields. At stand-still, the frequency of the voltages induced in the second windings are maximum, 60 Hz. The generator operates as a motor until it reaches the rotational speed of the rotating fields. When the prime mover drives the rotor above the synchronous speed, the voltages induced in the secondary are at frequencies which depend on the rotational speed. Reference is made to the example at page 2 herein. The secondary windings 22A, 22B, 22C are connected to slip rings (not shown) which permit the connection of components such as resistors, capacitors or inductors in the secondary winding circuit. As mentioned above, the generator acts as a motor until the rotor rotates above synchronous speed at which time it acts as a generator supplying power to the power lines.

In FIG. 2, resistors 23A, 23B, 23C and inductors 24A, 24B, 24C are connected in series with each respective winding 22A, 22B, 22C to a delta arrangement of capacitors 26A, 26B, 26C which in essence places capacitance in series with the resistors 23A, 23B, 23C and inductors 24A, 24B, 24C. In addition, resistors 27A, 27B, 27C are connected in series with each of the windings.

The resistors 27A, 27B, 27C act as a load on the primary, thereby increasing the current in the secondary winding. This current creates the necessary magnetism to permit the other components connected to the secondary to function. The reactive-capacitance components, 24A, 24B, 24C, 26A, 26B, 26C connected to the secondary windings are used for two purposes: (1) to improve the efficiency of the generator; and (2) to limit the output kilowatts at higher speeds. As described above, the frequency of the voltages induced in the secondary are dependent on the rotational speed of the rotor. The capacitive reactance decreased with frequency and the inductive reactance increases with frequency. If the capacitors 26A, 26B, 26C and inductors 24A, 24B, 24C are properly selected they will have equal reactive impedances at some frequency within the range of frequencies generated in the secondary. At this frequency (speed) the reactance is zero and maximum currents flow in the secondary, giving maximum power output. Above and below this frequency the output decreases. However, a run-away condition never exists.

The normal induction generator has a closed door effect when overloaded. At specific overload, the generator stops delivering power and unloads the prime mover. Unfortunately, the rpm at which this occurs is quite close to the rpm of normal generator usage. The no-load condition often causes the prime mover driving the generator to race to destruction.

The wound rotor induction generator with proper secondary components 23A, 23B, 23C; 24A, 24B, 24C; 26A, 26B, 26C continues to deliver output power as the speed increases. The wound rotor generator with proper components is therefore always under control electrically. It never sees the sudden no-load condition when operating with load. As mentioned above, the secondary components limit the output kilowatts as the speed gets too high. Thus, the unit is self-protecting. This kilowatt limiting effect is automatic with no contacts or relays. The limiting effect is beneficial to the generator and the prime mover.

An 8-pole, 60 Hz, normal 3 kw generator in accordance with FIG. 2 was connected to a power line. The value of each of the resistors 27, 27A, 27B, 27C was 1.44 ohms and the value of resistors 23A, 23B, 23C was 0 ohms. The capacitors 26 were 485 microfarad rated at 370 volts. Each of the inductors 24A, 24B, 24C were 0.140 Henry. The power-line frequency was 60 Hz. The rotor was rotated at speeds between 900 and 1125 rpm at the output power was measured (FIG. 4 is a plot of output power as a function of speed).

Figure 4:
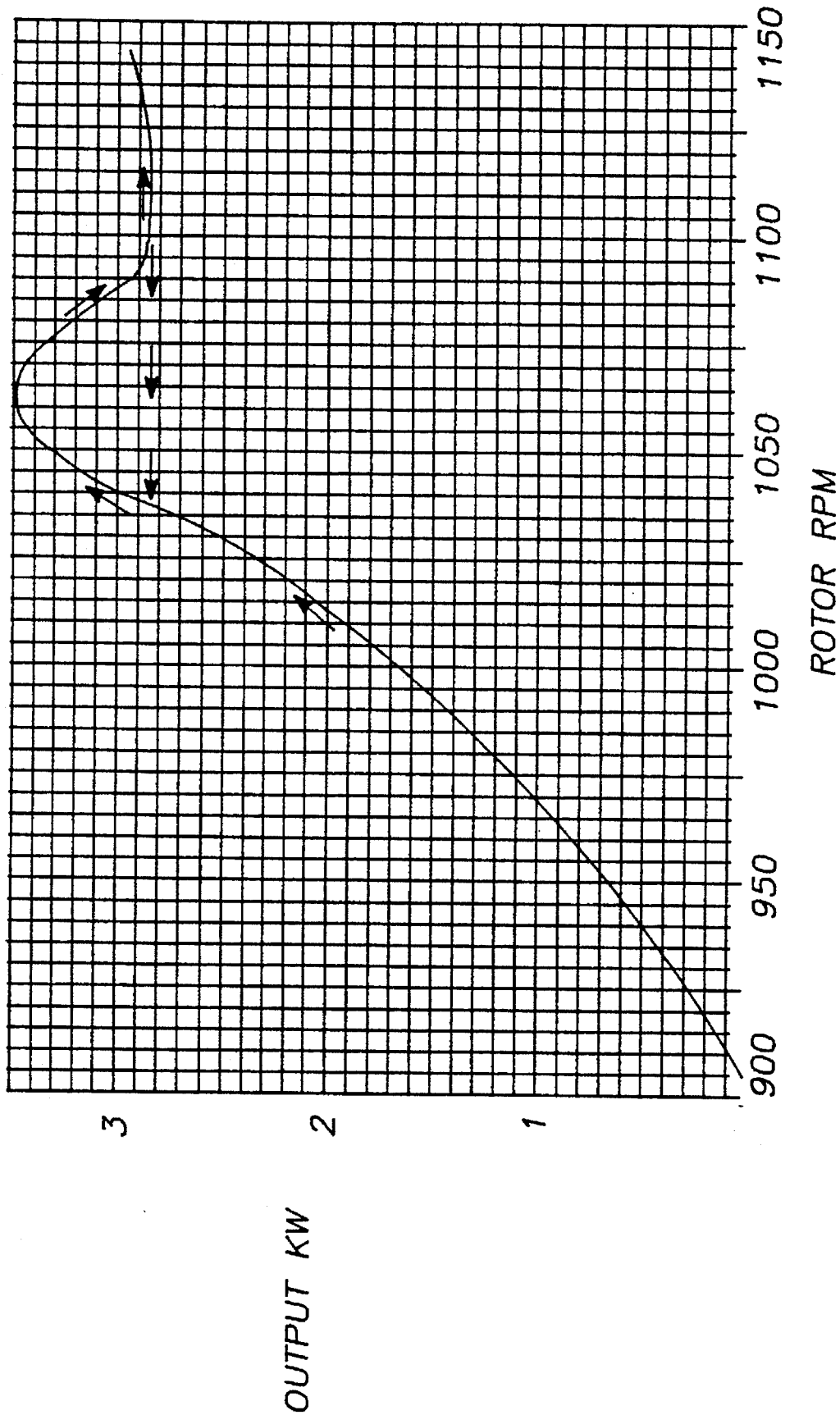
FIG. 4 shows output power as a function of speed for a generator constructed in accordance with FIG. 2.

FIG. 4 shows that at about 1060 rpm, the peak output was reached at 3.5 kw. Driving the machine faster, as could occur with an engine, a wave- or wind-driven machine causes the generator to decrease the kw output. At 1125 rpm the output is 2.8 kw. Driving to a higher speed increased the kilowatt slightly. The machine cannot be overloaded to destruction by overspeeding.

When the speed is reduced, as could happen from a wind gust, the return path versus rpm follows the dashed line, stopping at about 1040 rpm in this case. The generator now follows the curve downward.

By varying the value of the capacitors and inductors, the curve can be made to limit at 3 kw or even 2 kw, if desired. The fact that these components are external to the machine means that the curve can be varied at the installation site. Thus, with a change in conditions the components can be varied to match conditions.

Figure 3:
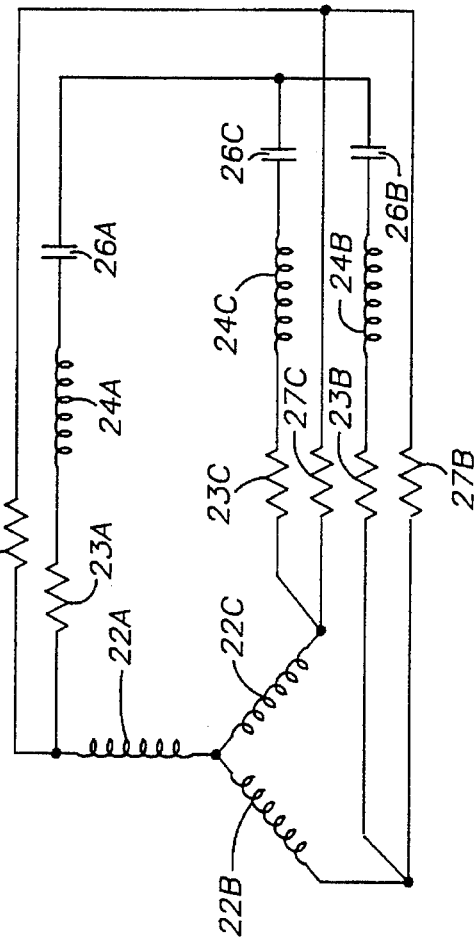
FIG. 3 is a schematic diagram of another wound rotor induction generator in accordance with this invention.

FIG. 3 shows substantially the same circuit except that the capacitors are connected in a wye configuration. It is, of course, apparent that the primary or secondary of the wound rotor motor/generator may be connected in either delta or wye configuration to achieve the objectives of the present invention. Also, the rotor or the stator may be either the primary of the secondary, provided the primary windings are correct for the primary voltage that is to be applied (the secondary components can always be matched to the secondary windings).

Therefore, there is provided a method for load limiting in electric power generators of the induction type with a wound rotor machine. This generator can be driven at variable speeds and maintain the constant frequency of the line connected thereto. The speeds can vary over a wide range above the synchronous (base) speed. Excess kilowatt output is controlled by the circuit employing a first circuit of three sets of resistors, inductors and capacitors in series. Then each set of said first circuit is connected to the secondary windings and the ends of the three sets connected together to form a wye (star) point.

Then each set is connected in parallel each with a separate set of resistors also connected to the secondary windings and joined together to obtain a wye (star) point. When the preset output limit of kilowatts is reached, the secondary components (resistors, inductors and capacitors in both circuits)

assist in determining at what speed this will occur, as well as the maximum point or number of kilowatts of output. The inductors in series with the capacitors initially act as ordinary resistors of very low ohmage, thereby permitting the capacitors to obtain whatever voltage is being generated. As the speed of the generator is increased, so is the frequency of the secondary output, resulting in a high resistance in the reactors, and the opposite effect in the capacitors, i.e., the capacitive reactance is decreased.

The synchronous or base speed of any three phase machine is found by substituting known values in this formula:

Synchronous or base rpm=120 f/number of poles where f is the frequency in Hz (cycles).

It has been found the inductive reactance at a specified frequency can be determined by the formula $$X_{L(Henries)} = 2\pi f L$$

wherein $X_L$ is the inductive reactance in ohms; f is frequency in Hz and L is induction in Henries. The capacitive reactance can be described by the formula $$X_{C(microfarads)} = 10^6 / 2\pi f C_{MF}$$

where $X_C$ is capacitive reactance in ohms, f is frequency in Hz and C is capacitance in microfarads.

The result of computing the resistance (R), capacitance (C) and inductance (L) in series is the impedance, Z, ohms:

$$Z = \sqrt{R^2 + (X_L - X_C)^2}$$

the kilowatt output of the generator is limited by: 1) the secondary winding resistance and the secondary resistors connected to the windings and; 2) the value of the reactors and capacitors connected to the secondary windings.

Each item can be adjusted to affect the output rpm, the output kilowatts, and the output efficiency. The items also affect the kilowatts at which the generator will limit its output as well as the point in kilowatts that the generator will go, if the speed is exceeded. The resistors 27A, 27B, 27C act to bring the limiting kilowatts and the kilowatts resulting after the limit, closer together. The foregoing is very important, and is not easily verified. The jump between the limiting kilowatts and the decrease where the limit is located, varies a great deal, with the resistors 27A, 27B, 27C acting as a vernier control.

For example, in a 3 kw machine (at 1138 rpm), the upper load limit can be made 3.5 kw or more. The moment this quantity is reached (1171 rpm in this example), the output kilowatts will decrease to anywhere from 3 to 1.5 kw. Generally the amperes decreases with the drop in kilowatts. (The 10 kVA non-regulated generator, used as a source of three-phase power in this experiment, immediately races to a much higher speed, 1287, with the lightened load. This would be impossible with a power utility line connected to the primary windings.)

The rotor speed must be reduced to come back to the point where the generator will start to increase its kilowatt output again. In this specific case, it appeared to be about 1129 rpm.

Under wind- or wave-power operation, the limiting capacity of the generator will accept gusts of wind or large waves without damage to the generator, and will pay for itself by accepting the gusts or large waves producing extra power pulses instead of discarding these comparatively large kilowatt loads.

The generator starts to generate well beyond its minimum limit in speed. For example, in the drop from 3.5 kw at about 1171 rpm mentioned above, the generator dropped to 3.0 kw. It "raced" to over 1200 rpm at the lower kilowatt output, where the generator could be driven to a higher speed without increasing its kilowatt output (but its input amperes will increase). The generator will come back to start generating above its lower limit., somewhat above the 1129 rpm it left, to reduce its kilowatt output.

The limiting points can be computed by knowing the winding resistance of the rotor for each phase and the resistance of the external resistance per phase. Using the formulae for the impedance of the reactors and the capacitors (which oppose each other) an approximation can be made. Then the resistor 27A, 27B, 27C can be used for slight changes as desired.

It will be seen that the present invention provides a wound rotor induction generator adapted to be driven by a prime mover for generating electrical power and wherein said adaptation will result in load limiting in the generator so that the generator can be run at variable speeds and maintain constant frequency of the line connected thereto and that others may readily adapt the invention for various applications without omitting features and elements that fairly constitute essential characteristics of the generic or specific aspects of this invention.

What is claimed is:

1. A rotary induction generator comprising
  a stator having wound thereon three-phase stator windings, said stator adapted to be connected to three-phase power lines operating at a predetermined frequency to generate rotating magnetic fields;
  a rotor having three-phase windings mounted for rotation within said stator, said rotor adapted to be rotated by a rotary drive means, said three-phase rotor winding being coupled to said rotating magnetic fields to induce in said windings voltages whose frequency is dependent on the rotational speed of said rotor with respect to the rotating magnetic fields;
  a first resistive means connected in series with each of said rotor windings to provide magnetizing currents responsive to said induced voltages; and
  a capacitive means and inductive means connected in series with each of said rotor windings and in parallel with said first resistive means responsive to said voltages to provide a series impedance which reaches a minimum when the frequency of the induced voltages in said secondary windings due to the rotary speed of the rotor is such that the capacitive impedance equals the inductive impedance whereby to provide maximum magnetizing current and generator output, said current decreasing when the frequency is above or below said frequency.

2. A rotary induction generator as in claim 1 including a prime mover connected to drive said rotor.

3. A rotary induction generator as in claim 2 wherein said prime mover is driven by wind power.

4. A rotary induction generator as in claim 2 wherein said prime mover is driven by wave power.

5. The method for generating electric power with a rotary induction generator having a stator with stator windings defining therein a three-phase stator and a rotor mounted for rotation in said stator and having wound thereon secondary rotor windings defining a three-phase rotor comprising:

connecting to a source of power to said stator windings whereby the applied power causes current to flow in said three-phase windings and provide a rotating magnetic field to induce currents in said secondary rotor windings;

rotating said rotor at a rotary speed greater than the speed of the rotating magnetic field to generate power in said stator windings;

connecting resistive-reactive means in series with said secondary windings to increase the efficiency of said generator and limit the power output to the power capacity of the generator over a wide range of speeds; and connecting independent resistive means in series with said secondary windings to provide the magnetizing currents in the secondary windings.

6. Method of regulating current output during electric power generation over a wide range of rotor speeds utilizing an induction generator driven by a prime mover comprising adapting a stator having wound thereon three-phase stator windings to connect to three phase power lines operating at a predetermined frequency to generate rotating magnetic fields;

rotating by a rotary drive means a rotor having three-phase windings mounted within said stator, said three-phase rotor winding being coupled to said rotating magnetic fields thereby inducing in said windings voltages whose frequency is dependent on the rotational speed of said driven rotor with respect to the rotating magnetic field;

connecting a first resistive means in series with each of said rotor windings to provide magnetizing currents responsive to said induced voltages, and connecting in series a second resistive means, capacitive means and inductive means with each of said rotor windings in parallel with said first resistive means responsive to said voltages to provide a series impedance which reaches a minimum when the frequency of the induced voltages in said secondary windings due to the rotary speed of the rotor is such that the capacitive impedance equals the inductive impedance to provide maximum magnetizing current and generator output, said current decreasing when the frequency is above or below said frequency.

* * * * *